United States Patent
Ye et al.

(10) Patent No.: US 9,965,086 B2
(45) Date of Patent: May 8, 2018

(54) METHOD FOR ENABLING FUNCTION MODULE OF TERMINAL, AND TERMINAL DEVICE

(71) Applicant: Huawei Technologies Co., Ltd., Shenzhen (CN)

(72) Inventors: Min Ye, Hangzhou (CN); Yuanwang Liu, Shenzhen (CN); Zhen He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 14/980,444

(22) Filed: Dec. 28, 2015

(65) Prior Publication Data

US 2016/0132178 A1 May 12, 2016

Related U.S. Application Data

(63) Continuation of application No. PCT/CN2014/083734, filed on Aug. 5, 2014.

(30) Foreign Application Priority Data

Dec. 13, 2013 (CN) .......................... 2013 1 0690582

(51) Int. Cl.
*G06F 3/041* (2006.01)
*G06F 3/038* (2013.01)
(Continued)

(52) U.S. Cl.
CPC ............ *G06F 3/0416* (2013.01); *G06F 3/038* (2013.01); *G06F 3/03547* (2013.01); *G06F 3/04883* (2013.01); *G06F 2203/0339* (2013.01)

(58) Field of Classification Search
CPC .... G06F 3/0416; G06F 3/038; G06F 3/03547; G06F 3/04883; G06F 2203/039
See application file for complete search history.

(56) References Cited

U.S. PATENT DOCUMENTS

2010/0321289 A1 12/2010 Kim et al.
2011/0074344 A1* 3/2011 Park .................. H01F 38/14
320/108
(Continued)

FOREIGN PATENT DOCUMENTS

CA 202160214 U 3/2012
CN 101281439 A 10/2008
(Continued)

OTHER PUBLICATIONS

Partial English Translation and Abstract of Chinese Patent Application No. CN102109947, dated Nov. 6, 2015, 4 pages.
(Continued)

*Primary Examiner* — Christopher E Leiby
(74) *Attorney, Agent, or Firm* — Conley Rose, P.C.

(57) ABSTRACT

A method for enabling a function module of a terminal, and a terminal device. The method includes detecting a touch operation that is performed by a user on a sensor, where the sensor is disposed in an area on an outer surface of the terminal except on a touchscreen; generating touch information according to the touch operation; and when the generated touch information meets a condition of enabling a function module of the terminal or enabling a function type of the function module, enabling the function module or the function type of the function module.

6 Claims, 3 Drawing Sheets

(51) Int. Cl.
*G06F 3/0488* (2013.01)
*G06F 3/0354* (2013.01)

(56) References Cited

U.S. PATENT DOCUMENTS

| | | | | |
|---|---|---|---|---|
| 2013/0175986 | A1* | 7/2013 | Senatori | G06F 1/1616 320/108 |
| 2013/0315402 | A1* | 11/2013 | Visser | G10L 19/00 381/18 |
| 2014/0160063 | A1* | 6/2014 | Yairi | G06F 3/044 345/174 |
| 2016/0357328 | A1* | 12/2016 | Hu | G06F 3/04886 |

FOREIGN PATENT DOCUMENTS

| | | |
|---|---|---|
| CN | 102109947 A | 6/2011 |
| CN | 102339151 A | 2/2012 |
| CN | 103049186 A | 4/2013 |
| CN | 103049209 A | 4/2013 |
| CN | 103167179 A | 6/2013 |
| CN | 103227869 A | 7/2013 |
| CN | 103699260 A | 4/2014 |

OTHER PUBLICATIONS

Partial English Translation and Abstract of Chinese Patent Application No. CN103167179, dated Nov. 6, 2015, 4 pages.
Partial English Translation and Abstract of Chinese Patent Application No. CN103699260, dated Nov. 6, 2015, 4 pages.
Partial English Translation and Abstract of Chinese Patent Application No. CN202160214, dated Nov. 6, 2015, 16 pages.
Partial English Translation and Abstract of Chinese Patent Application No. CN102339151, dated Feb. 18, 2016, 3 pages.
Partial English Translation and Abstract of Chinese Patent Application No. CN103049209, dated Feb. 18, 2016, 4 pages.
Partial English Translation and Abstract of Chinese Patent Application No. CN101281439, dated Feb. 18, 2016, 3 pages.
Partial English Translation and Abstract of Chinese Patent Application No. CN103227869, dated Feb. 18, 2016, 4 pages.
Foreign Communication From A Counterpart Application, Chinese Application No. 201310690582.6, Chinese Office Action dated Feb. 6, 2016, 6 pages.
Foreign Communication From A Counterpart Application, Chinese Application No. 201310690582.6, Chinese Search Report dated Jan. 31, 2016, 2 pages.
Foreign Communication From A Counterpart Application, PCT Application No. PCT/CN2014/083734, English Translation of International Search Report dated Nov. 13, 2014, 2 pages.
Foreign Communication From A Counterpart Application, PCT Application No. PCT/CN2014/083734, Written Opinion dated Nov. 6, 2014, 5 pages.

* cited by examiner

METHOD FOR ENABLING FUNCTION MODULE OF TERMINAL, AND TERMINAL DEVICE

CROSS-REFERENCE TO RELATED APPLICATIONS

This application is a continuation of International Application No. PCT/CN2014/083734, filed on Aug. 5, 2014, which claims priority to Chinese Patent Application No. 201310690582.6, filed on Dec. 13, 2013, both of which are hereby incorporated by reference in their entireties.

TECHNICAL FIELD

The present disclosure relates to the field of electronic technologies, and in particular, to a method for enabling a function module of a terminal, and a terminal device.

BACKGROUND

With the popularity of smartphones, more and more user interaction operations are performed inside a screen. At present, for enabling of functions of function modules on most terminals (such as a photographing function of a camera, a lighting function of a camera, a videotaping function of a camera, and a loudspeaker function for a call), an operation needs to be performed after entering a terminal interface above more than one level, to implement corresponding enabling. For example, when a screen of a terminal is in a sleep mode, a user at least needs to unlock a lock interface of the terminal to enter a desktop interface, to enable a photographing function of a camera of the terminal by touching a shortcut icon on the desktop interface. Even in some cases, when there is no functional shortcut icon on the desktop interface, the user further needs to enter an icon interface of an application to enable a corresponding function of a function module of the terminal. Therefore, at present, for an enabling manner of enabling, based on a touchscreen, a function of a function module, a dependency on the touchscreen and complexity of operations on multiple levels of interfaces exist to some extent.

SUMMARY

Embodiments of the present disclosure provide a method for enabling a function module of a terminal, and a terminal device, which can quickly enable a function module of a terminal using touch information generated when a user touches a sensor on the terminal except on a touchscreen.

A first aspect of the present disclosure provides a method for enabling a function module of a terminal, where the method may include detecting a touch operation that is performed by a user on a sensor, where the sensor is disposed in an area on an outer surface of the terminal except on a touchscreen; generating touch information according to the touch operation; and when the generated touch information meets a condition of enabling a function module of the terminal or enabling a function type of the function module, enabling the function module or the function type of the function module.

With reference to the first aspect, in a first feasible implementation manner, the touch information includes at least a touch location, and the touch information further includes at least one of touch time, a touch gesture, and a touched-sensor type.

With reference to the first feasible implementation manner of the first aspect, in a second feasible implementation manner, that the generated touch information meets a condition of enabling a function module of the terminal or enabling a function type of the function module includes that, when the generated touch location is the same as a saved touch location that is used for enabling a function module of the terminal or enabling a function type of the function, it is determined that the generated touch information meets the condition of enabling the function module of the terminal or enabling the function type of the function.

With reference to the first feasible implementation manner of the first aspect, in a third feasible implementation manner, that the generated touch information meets a condition of enabling a function module of the terminal or enabling a function type of the function module includes that, when the generated touch location and generated touch time are the same as a saved touch location and saved touch time that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in a fourth feasible implementation manner, that the generated touch information meets a condition of enabling a function module of the terminal or enabling a function type of the function module includes that, when the generated touch location and the generated touch gesture are the same as a saved touch location and a saved touch gesture that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in a fifth feasible implementation manner, that the generated touch information meets a condition of enabling a function module of the terminal or enabling a function type of the function module includes that, when the generated touch location and the generated touched-sensor type are the same as a saved touch location and a saved touched-sensor type that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in a sixth feasible implementation manner, that the generated touch information meets a condition of enabling a function module of the terminal or enabling a function type of the function module includes that, when the generated touch location, generated touch time, and the generated touch gesture are the same as a saved touch location, saved touch time, and a saved touch gesture that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in a seventh feasible implementation manner, that the generated touch information meets a condition of enabling a function module of the terminal or enabling a function type of the function module includes that, when the generated touch location, generated touch time, and the generated touched-sensor type are the same as a saved touch location, saved touch time, and a saved touched-sensor type that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in an eighth feasible implementation manner, that the generated touch information meets a condition of enabling a function module of the terminal or enabling a function type of the function module includes that, when the generated touch location, the generated touch gesture, and the generated touched-sensor type are the same as a saved touch location, a saved touch gesture, and a saved touched-sensor type that are used for enabling a function module of the terminal or enabling a function type of the function, respectively, it is determined that the generated touch information meets the condition of enabling the function module of the terminal or enabling the function type of the function.

With reference to the first feasible implementation manner of the first aspect, in a ninth feasible implementation manner, that the generated touch information meets a condition of enabling a function module of the terminal or enabling a function type of the function module includes that, when the generated touch location, generated touch time, the generated touch gesture, and the generated touched-sensor type are the same as a saved touch location, saved touch time, a saved touch gesture, and a saved touched-sensor type that are used for enabling a function module of the terminal or enabling a function type of the function, respectively, it is determined that the generated touch information meets the condition of enabling the function module of the terminal or enabling the function type of the function.

With reference to any one of the first aspect to the ninth feasible implementation manners of the first aspect, in a tenth feasible implementation manner, the sensor includes at least one of a temperature sensor, a capacitive sensor, a resistive sensor, an infrared optical sensor, a pressure sensor, and a levitation sensor.

With reference to any one of the first aspect to the ninth feasible implementation manners of the first aspect, in an eleventh feasible implementation manner, the function module includes at least one of a camera, a loudspeaker, an earpiece, an audio monitoring unit, a subscriber identity module (SIM) switchover module, and a wireless charging module.

A second aspect of the present disclosure provides a terminal device, where the terminal device may include at least one function module, where the function module is configured to implement a service function; at least one sensor disposed in an area on an outer surface of a terminal except on a touchscreen and configured to detect a touch operation of a user; an information processing module configured to generate touch information according to the touch operation detected by the sensor; and an enabling control module configured to, when the touch information generated by the information processing module meets a condition of enabling a function module of the terminal or enabling a function type of the function module, enable the function module or the function type of the function module.

With reference to the second aspect, in a first feasible implementation manner, the touch information includes at least a touch location, and the touch information further includes at least one of touch time, a touch gesture, and a touched-sensor type.

With reference to the first feasible implementation manner of the second aspect, in a second feasible implementation manner, the enabling control module is configured to, when a touch location generated by the information processing module is the same as a saved touch location that is used for enabling a function module of the terminal or enabling a function type of the function, determine that the generated touch information meets the condition of enabling the function module of the terminal or enabling the function type of the function.

With reference to the first feasible implementation manner of the second aspect, in a third feasible implementation manner, the enabling control module is configured to, when a touch location and touch time that are generated by the information processing module are the same as a saved touch location and saved touch time that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in a fourth feasible implementation manner, the enabling control module is configured to, when a touch location and a touch gesture that are generated by the information processing module are the same as a saved touch location and a saved touch gesture that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in a fifth feasible implementation manner, the enabling control module is configured to, when a touch location and a touched-sensor type that are generated by the information processing module are the same as a saved touch location and a saved touched-sensor type that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in a sixth feasible implementation manner, the enabling control module is configured to, when a touch location, touch time, and a touch gesture that are generated by the information processing module are the same as a saved touch location, saved touch time, and a saved touch gesture that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in a seventh feasible implementation manner, the enabling control module is configured to, when a touch location, touch time, and a touched-sensor type that are generated by the information processing module are the same as a saved touch location, saved touch time, and a saved touched-sensor type that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in an eighth feasible implementation manner, the enabling control module is configured to, when a touch location, a touch gesture, and a touched-sensor type that are generated by the information processing module are the same as a saved touch location, a saved touch gesture, and a saved touched-sensor type that are used for enabling a function module of the terminal or enabling a function type of the function, respectively, determine that the generated touch information meets the condition of enabling the function module of the terminal or enabling the function type of the function.

With reference to the first feasible implementation manner of the second aspect, in a ninth feasible implementation manner, the enabling control module is configured to, when a touch location, touch time, a touch gesture, and a touched-sensor type that are generated by the information processing module are the same as a saved touch location, saved touch time, a saved touch gesture, and a saved touched-sensor type that are used for enabling a function module of the terminal or enabling a function type of the function, respectively, determine that the generated touch information meets the condition of enabling the function module of the terminal or enabling the function type of the function.

With reference to any one of the second aspect to the ninth feasible implementation manners of the second aspect, in a tenth feasible implementation manner, the sensor includes at least one of a temperature sensor, a capacitive sensor, a resistive sensor, an infrared optical sensor, a pressure sensor, and a levitation sensor.

With reference to any one of the second aspect to the ninth feasible implementation manners of the second aspect, in an eleventh feasible implementation manner, the function module includes at least one of a camera, a loudspeaker, an earpiece, an audio monitoring unit, a SIM switchover module, and a wireless charging module.

It can be seen from the foregoing that in some feasible implementation manners of the present disclosure, a touch operation that is performed by a user on a sensor is detected, where the sensor is disposed in an area on an outer surface of the terminal except on a touchscreen; touch information is generated according to the touch operation; and when the generated touch information meets a condition of enabling a function module of the terminal or enabling a function type of the function module, the function module or the function type of the function module is enabled. Therefore, in the embodiments of the present disclosure, the function module of the terminal can be quickly enabled using touch information generated when the user touches the sensor on the terminal except on the touchscreen, thereby avoiding a dependency on the touchscreen and complexity of operations on multiple levels of interfaces when the function module of the terminal is enabled.

DESCRIPTION OF EMBODIMENTS

To make the objectives, technical solutions, and advantages of the present disclosure clearer, the following further describes the present disclosure in detail with reference to the accompanying drawings.

Before embodiments are described in detail, a range of a terminal in the embodiments of the present disclosure and a range of a function module of the terminal in the embodiments of the present disclosure are first described.

In an implementation, the terminal in the present disclosure includes a device in which a sensor may be disposed, such as a mobile phone, a tablet computer, a player, a television, a computer, or a set top box.

In an implementation, the function module of the terminal in the present disclosure includes a hardware function module or a software function module, such as a camera, a loudspeaker, an earpiece, an audio monitoring unit, a SIM switchover module, or a wireless charging module.

Figure 1:
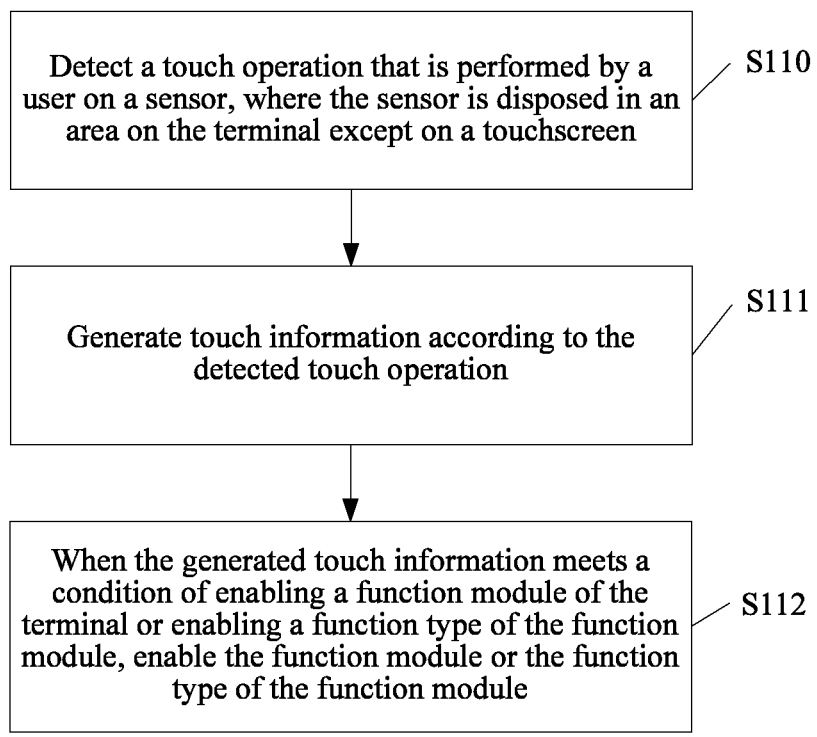
FIG. 1 is a schematic flowchart of an embodiment of a method for enabling a function module of a terminal in embodiments of the present disclosure.

FIG. 1 is a schematic flowchart of an embodiment of a method for enabling a function module of a terminal in the embodiments of the present disclosure. As shown in FIG. 1, the method in this embodiment of the present disclosure may include the following steps.

Step S110: Detect a touch operation that is performed by a user on a sensor, where the sensor is disposed in an area on an outer surface of the terminal except on a touchscreen.

In an implementation, in this embodiment of the present disclosure, the sensor may be disposed on the terminal and the touch operation that is performed by the user on the sensor is detected using the sensor. A location of the sensor in this embodiment of the present disclosure is set in an area on the terminal except on a touchscreen, which can avoid a dependency on the touchscreen when a function module of the terminal is enabled in this embodiment of the present disclosure. There may be multiple manners of setting the location of the sensor. For example, when the function module of the terminal includes a hardware function module, the sensor may be disposed in an area in which the hardware function module is disposed (for example, disposed less than 2 centimeters (cm) away from the hardware function module). For another example, when the function module of the terminal includes a software function module, in this case, the sensor may be disposed at any location on the terminal except on the touchscreen.

In an implementation, the sensor in this embodiment of the present disclosure may include at least one of a temperature sensor, a capacitive sensor, a resistive sensor, an infrared optical sensor, a pressure sensor, and a levitation sensor. Manners of detecting a user operation by different sensors may be different. For example, when the sensor is a temperature sensor, when a user moves within a range set by the temperature sensor, and a temperature value of the temperature sensor reaches a set threshold, it may be considered that the temperature sensor detects that the user performs a touch operation on the temperature sensor. For another example, when the sensor is a capacitive sensor, when a user touches a surface of the capacitive sensor, the capacitive sensor may detect that the user performs a touch operation on the capacitive sensor.

Step S111: Generate touch information according to the touch operation.

In an implementation, when performing a touch operation on the sensor, a user may perform a single tap operation or perform a complex track operation. Therefore, in step S111, different touch information may be generated according to different touch operations performed by the user. The touch information in this embodiment of the present disclosure includes at least a touch location. Besides, the touch information further includes at least one of touch time, a touch gesture, and a touched-sensor type. In implementation, the touch location may include a location at which the touched sensor is disposed. The touch time may include duration in which the user touches the corresponding sensor. The touch gesture includes a touch track of the user, such as a left swipe and a right swipe.

In an implementation, in step S111, different types of touch information may be generated according to different touch operations. Generally, in step S111, at least one of the following steps may be performed: generating a touch location according to the touch operation; generating touch time according to the touch operation; generating a touch gesture according to the touch operation; and generating a sensor type according to the touch operation.

Step S112: When the generated touch information meets a condition of enabling a function module of the terminal or enabling a function type of the function module, enable the function module or the function type of the function module.

In an implementation, in step S112, that the generated touch information meets a condition of enabling a function module of the terminal or enabling a function type of the function module may include that, when the generated touch location is the same as a saved touch location that is used for enabling a function module of the terminal or enabling a function type of the function, it is determined that the generated touch information meets the condition of enabling the function module of the terminal or enabling the function type of the function. For example, assuming that a saved touch location that is used for enabling a photographing function of a camera of the terminal is a touch location less than 2 cm away from the camera, when the generated touch location is also less than 2 cm away from the camera, it is determined that generated touch information meets a touch condition of enabling the photographing function of the camera, and then the photographing function of the camera may be enabled in step S112.

In an implementation, in step S112, that the generated touch information meets a condition of enabling a function module of the terminal or enabling a function type of the function module may include that, when the generated touch location and generated touch time are the same as a saved touch location and saved touch time that are used for enabling a function module of the terminal or enabling a function type of the function, respectively, it is determined that the generated touch information meets the condition of enabling the function module of the terminal or enabling the function type of the function. For example, assuming that a saved touch location that is used for enabling a videotaping function of a camera of the terminal is a touch location less than 2 cm away from the camera, and time of touch at the touch location is at least 3 seconds (s), when the generated touch location is also less than 2 cm away from the camera, and generated time of touch at the touch location is at least 3 s, it is determined that generated touch information meets a touch condition of enabling the photographing function of the camera, and then the videotaping function of the camera may be enabled in step S112.

In an implementation, in step S112, that the generated touch information meets a condition of enabling a function module of the terminal or enabling a function type of the function module includes that, when the generated touch location and the generated touch gesture are the same as a saved touch location and a saved touch gesture that are used for enabling a function module of the terminal or enabling a function type of the function, respectively, it is determined that the generated touch information meets the condition of enabling the function module of the terminal or enabling the function type of the function. For example, assuming that a saved touch location that is used for enabling a loudspeaker function of a loudspeaker of the terminal is a touch location less than 1 cm away from the loudspeaker, and a touch gesture is a right swipe, when the generated touch location is also less than 1 cm away from the loudspeaker, and the generated touch gesture is a right swipe, it is determined that generated touch information meets a touch condition of enabling the loudspeaker function of the loudspeaker, and then the loudspeaker function of the loudspeaker may be enabled in step S112.

In an implementation, in step S112, that the generated touch information meets a condition of enabling a function module of the terminal or enabling a function type of the function module includes that, when the generated touch location and the generated touched-sensor type are the same as a saved touch location and a saved touched-sensor type that are used for enabling a function module of the terminal or enabling a function type of the function, respectively, it is determined that the generated touch information meets the condition of enabling the function module of the terminal or enabling the function type of the function. For example, assuming that a saved touch location that is used for enabling a wireless charging function module of the terminal is a location of a mobile phone housing directly opposite to the wireless charging function module, and a touched-sensor type is a temperature sensor, when the generated touch location is also the location of the mobile phone housing directly opposite to the wireless charging function module, and a touched sensor is a temperature sensor, it is determined that generated touch information meets a touch condition of enabling the wireless charging function module, and then the wireless charging module may be enabled to charge a mobile phone battery in step S112.

In an implementation, in step S112, that the generated touch information meets a condition of enabling a function module of the terminal or enabling a function type of the function module includes that, when the generated touch location, generated touch time, and the generated touch gesture are the same as a saved touch location, saved touch time, and a saved touch gesture that are used for enabling a function module of the terminal or enabling a function type of the function, respectively, it is determined that the generated touch information meets the condition of enabling the function module of the terminal or enabling the function type of the function.

In an implementation, in step S112, that the generated touch information meets a condition of enabling a function module of the terminal or enabling a function type of the function module includes that, when the generated touch location, generated touch time, and the generated touched-sensor type are the same as a saved touch location, saved touch time, and a saved touched-sensor type that are used for enabling a function module of the terminal or enabling a function type of the function, respectively, it is determined that the generated touch information meets the condition of enabling the function module of the terminal or enabling the function type of the function.

In an implementation, in step S112, that the generated touch information meets a condition of enabling a function module of the terminal or enabling a function type of the function module includes that, when the generated touch location, the generated touch gesture, and the generated touched-sensor type are the same as a saved touch location, a saved touch gesture, and a saved touched-sensor type that are used for enabling a function module of the terminal or enabling a function type of the function, respectively, it is determined that the generated touch information meets the condition of enabling the function module of the terminal or enabling the function type of the function.

In an implementation, in step S112, that the generated touch information meets a condition of enabling a function module of the terminal or enabling a function type of the function module includes that, when the generated touch location, generated touch time, the generated touch gesture, and the generated touched-sensor type are the same as a saved touch location, saved touch time, a saved touch gesture, and a saved touched-sensor type that are used for enabling a function module of the terminal or enabling a function type of the function, respectively, it is determined that the generated touch information meets the condition of enabling the function module of the terminal or enabling the function type of the function.

It can be seen from the foregoing that in this embodiment of the present disclosure, a sensor is disposed in an area on a terminal except on a touchscreen, and a function module of the terminal is enabled using touch information that is generated according to a touch operation performed by a user on the sensor. Therefore, in this embodiment of the present disclosure, a dependency on the touchscreen and complexity of operations on multiple levels of interfaces when the function module of the terminal is enabled are avoided.

Figure 2:
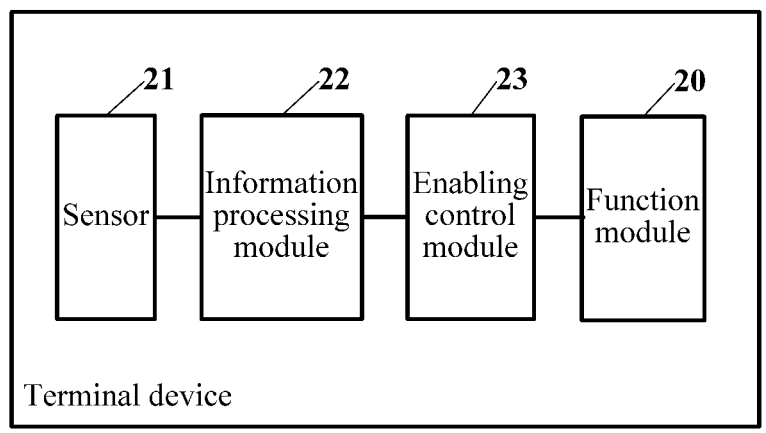
FIG. 2 is a schematic structural diagram of an embodiment of a terminal device in the embodiments of the present disclosure.

FIG. 2 is a schematic structural diagram of an embodiment of a terminal device in the embodiments of the present disclosure. As shown in FIG. 2, the terminal device in this embodiment of the present disclosure may include at least one function module 20 (one function module 20 is used as an example in the figure), at least one sensor 21 (one sensor 21 is used as an example in the figure), an information processing module 22, and an enabling control module 23.

Each function module 20 is configured to implement various service functions of a terminal.

In an implementation, the function module 20 in this embodiment of the present disclosure includes a hardware function module or a software function module, such as a camera, a loudspeaker, an earpiece, an audio monitoring unit, a SIM switchover module, or a wireless charging module.

The sensor 21 is disposed in an area on an outer surface of the terminal except on a touchscreen and configured to detect a touch operation of a user.

A location of the sensor 21 in this embodiment of the present disclosure is set in an area on the terminal except on a touchscreen, thereby avoiding a dependency on the touchscreen when the function module of the terminal is enabled in this embodiment of the present disclosure. There may be multiple manners of setting the location of the sensor 21. For example, when the function module 20 of the terminal includes a hardware function module, the sensor 21 may be disposed in a specified area in which the hardware function module is disposed (for example, disposed less than 2 cm away from the hardware function module). For another example, when the function module of the terminal includes a software function module, in this case, the sensor may be disposed at any location on the terminal except on the touchscreen.

In an implementation, the sensor 21 in this embodiment of the present disclosure may include at least one of a temperature sensor, a capacitive sensor, a resistive sensor, an infrared optical sensor, a pressure sensor, and a levitation sensor. Manners of detecting a user operation by different sensors 21 may be different. For example, when the sensor 21 is a temperature sensor, and when a user moves within a range specified by the temperature sensor, and a temperature value of the temperature sensor reaches a set threshold, it may be considered that the temperature sensor detects that the user performs a touch operation on the temperature sensor. For another example, when the sensor 21 is a capacitive sensor, and when a user touches a surface of the capacitive sensor, the capacitive sensor may detect that the user performs a touch operation on the capacitive sensor.

The information processing module 22 is configured to generate touch information according to the touch operation detected by the sensor 21.

In an implementation, when performing an operation on the sensor 21, a user may perform a single tap operation or perform a complex track operation. Therefore, the information processing module 22 may generate different touch information according to different touch operations performed by the user. The touch information in this embodiment of the present disclosure includes at least touch location information. In addition to a touch location, the touch information may further include at least one of touch time, a touch gesture, and a touched-sensor type. In an implementation, the touch location may include a location at which the touched sensor is disposed. The touch time may include duration in which the user touches the corresponding sensor. The touch gesture includes a touch track of the user, such as a left swipe and a right swipe.

Figure 3:
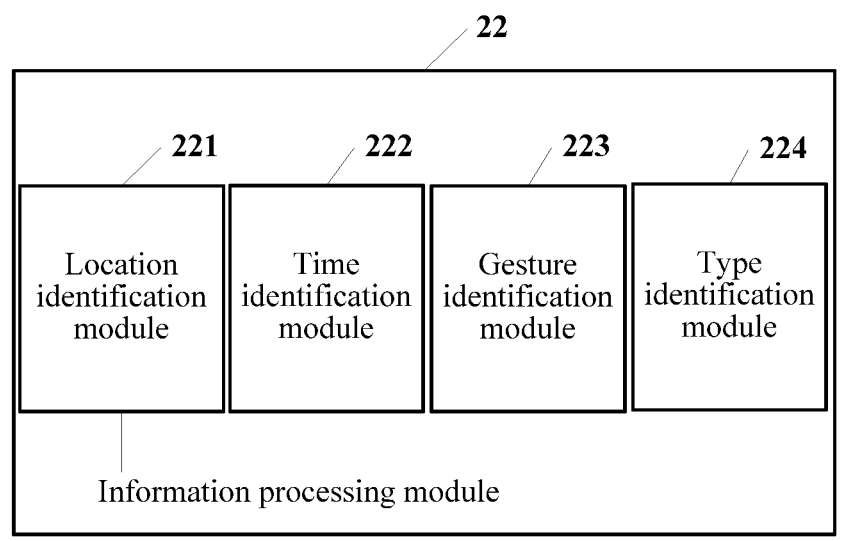
FIG. 3 is a schematic structural diagram of an embodiment of an information processing module in the embodiments of the present disclosure.

In an implementation, as shown in FIG. 3, the information processing module 22 may include a location identification module 221 configured to generate a touch location according to the touch operation detected by the sensor 21; besides, the information processing module 22 may further include at least one of the following modules: a time identification module 222 configured to generate touch time according to the touch operation detected by the sensor 21; a gesture identification module 223 configured to generate a touch gesture according to the touch operation detected by the sensor 21; and a type identification module 224 configured to generate a touched-sensor type according to the touch operation detected by the sensor 21.

The enabling control module 23 is configured to, when the touch information generated by the information processing module 22 meets a condition of enabling a function module of the terminal or enabling a function type of the function module, enable the function module or the function type of the function module.

Figure 4:
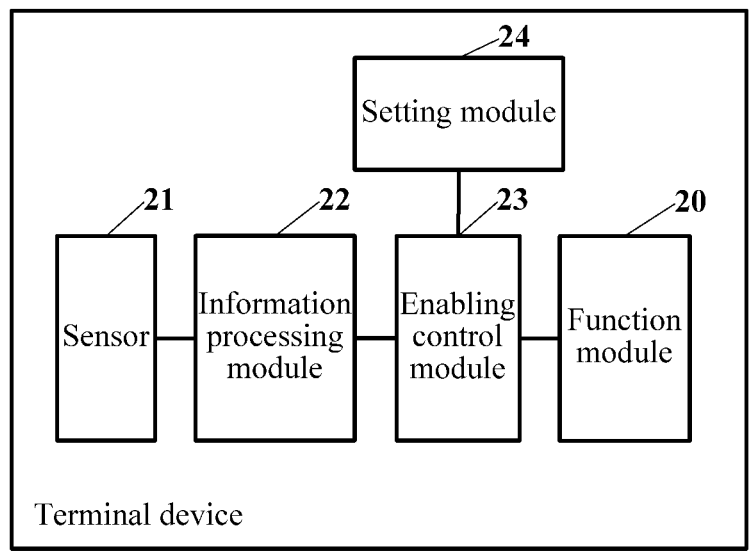
FIG. 4 is a schematic structural diagram of another embodiment of a terminal device in the embodiments of the present disclosure.

In an implementation, as shown in FIG. 4, the terminal device in this embodiment of the present disclosure may further include a setting module 24 configured to preset and save a condition, which needs to be met, of enabling the function module 20 or enabling a function type of the function module 20. Conditions of enabling different function modules may be set to be the same or different.

In some feasible implementation manners, the enabling control module 23 is configured to, when the generated touch location is the same as a saved touch location that is used for enabling a function module of the terminal or enabling a function type of the function, determine that the generated touch information meets the condition of enabling the function module of the terminal or enabling the function type of the function. For example, assuming that a saved touch location that is used for enabling a photographing function of a camera of the terminal is a touch location less than 2 cm away from the camera, when the generated touch location is also less than 2 cm away from the camera, the enabling control module 23 determines that generated touch information meets a touch condition of enabling the photographing function of the camera, and enables the photographing function of the camera.

In some feasible implementation manners, the enabling control module 23 is configured to, when the generated touch location and generated touch time are the same as a saved touch location and saved touch time that are used for enabling a function module of the terminal or enabling a function type of the function, respectively, determine that the generated touch information meets the condition of enabling the function module of the terminal or enabling the function type of the function. For example, assuming that a saved touch location that is used for enabling a videotaping function of a camera of the terminal is a touch location less than 2 cm away from the camera, and time of touch at the touch location is at least 3 s, when the generated touch location is also less than 2 cm away from the camera, and generated time of touch at the touch location is at least 3 s, the enabling control module 23 determines that generated touch information meets a touch condition of enabling the photographing function of the camera, and enables the videotaping function of the camera.

In some feasible implementation manners, the enabling control module 23 is configured to, when the generated touch location and the generated touch gesture are the same as a saved touch location and a saved touch gesture that are used for enabling a function module of the terminal or enabling a function type of the function, respectively, determine that the generated touch information meets the condition of enabling the function module of the terminal or enabling the function type of the function. For example, assuming that a saved touch location that is used for enabling a loudspeaker function of a loudspeaker of the terminal is a touch location less than 1 cm away from the loudspeaker, and a touch gesture is a right swipe, when the generated touch location is also less than 1 cm away from the loudspeaker, and the generated touch gesture is a right swipe, the enabling control module 23 determines that generated touch information meets a touch condition of enabling the loudspeaker function of the loudspeaker, and enables the loudspeaker function of the loudspeaker.

In some feasible implementation manners, the enabling control module 23 is configured to, when the generated touch location and the generated touched-sensor type are the same as a saved touch location and a saved touched-sensor type that are used for enabling a function module of the terminal or enabling a function type of the function, respectively, determine that the generated touch information meets the condition of enabling the function module of the terminal or enabling the function type of the function. For example, assuming that a saved touch location that is used for enabling a wireless charging function module of the terminal is a location of a mobile phone housing directly opposite to the wireless charging function module, and a touched-sensor type is a temperature sensor, when the generated touch location is also the location of the mobile phone housing directly opposite to the wireless charging function module, and a touched sensor is a temperature sensor, the enabling control module 23 determines that generated touch information meets a touch condition of enabling the wireless charging function module, and enables the wireless charging module to charge a mobile phone battery.

In some feasible implementation manners, the enabling control module 23 is configured to, when the generated touch location, generated touch time, and the generated touch gesture are the same as a saved touch location, saved touch time, and a saved touch gesture that are used for enabling a function module of the terminal or enabling a function type of the function, respectively, determine that the generated touch information meets the condition of enabling the function module of the terminal or enabling the function type of the function.

In some feasible implementation manners, the enabling control module 23 is configured to, when the generated touch location, generated touch time, and the generated touched-sensor type are the same as a saved touch location, saved touch time, and a saved touched-sensor type that are used for enabling a function module of the terminal or enabling a function type of the function, respectively, determine that the generated touch information meets the condition of enabling the function module of the terminal or enabling the function type of the function.

In some feasible implementation manners, the enabling control module 23 is configured to, when the generated touch location, the generated touch gesture, and the generated touched-sensor type are the same as a saved touch location, a saved touch gesture, and a saved touched-sensor type that are used for enabling a function module of the terminal or enabling a function type of the function, respectively, determine that the generated touch information meets the condition of enabling the function module of the terminal or enabling the function type of the function.

In some feasible implementation manners, the enabling control module 23 is configured to, when the generated touch location, generated touch time, the generated touch gesture, and the generated touched-sensor type are the same as a saved touch location, saved touch time, a saved touch gesture, and a saved touched-sensor type that are used for enabling a function module of the terminal or enabling a function type of the function, respectively, determine that the generated touch information meets the condition of enabling the function module of the terminal or enabling the function type of the function.

It can be seen from the foregoing that in this embodiment of the present disclosure, a sensor is disposed in an area on a terminal except on a touchscreen, and a function module of the terminal is enabled using touch information that is generated according to a touch operation performed by a user on the sensor. Therefore, in this embodiment of the present disclosure, a dependency on the touchscreen and complexity of operations on multiple levels of interfaces when the function module of the terminal is enabled are avoided.

Figure 5:
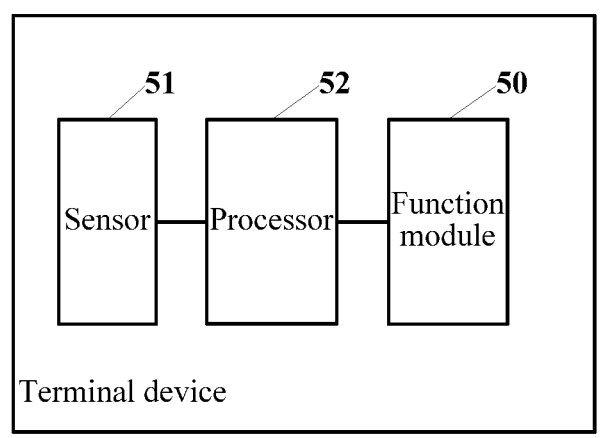
FIG. 5 is a schematic structural diagram of another embodiment of a terminal device in the embodiments of the present disclosure.

FIG. 5 is a schematic structural diagram of another embodiment of a terminal device in the embodiments of the present disclosure. As shown in FIG. 5, the terminal device in this embodiment of the present disclosure may include at least one function module 50, at least one sensor 51, and a processor 52. The function module 50 is the same as the function module 20, and details are not repeatedly described herein. The sensor 51 is the same as the sensor 21, and details are not repeatedly described herein. In this embodiment, the processor 52 may be used to replace the information processing module 22 and the enabling control module 23 in the embodiment shown in FIG. 2. In this embodiment, the processor 52 runs program code to implement the following functions: generating touch information according to a touch operation detected by the sensor 51, and when the generated touch information meets a condition of enabling a function module of the terminal or enabling a function type of the function module, enabling the function module or the function type of the function module. In this embodiment, the touch information is similar to that in the foregoing embodiments, and details are not repeatedly described herein. In this embodiment, the condition of enabling the function module or the function type of the function module is similar to that in the foregoing embodiments, and details are not repeatedly described herein.

Modules in this embodiment of the present disclosure may be implemented using a general integrated circuit (such as a central processing unit (CPU)) or an application-specific integrated circuit (ASIC). A person of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM), a random access memory (RAM), a magnetic disk, and an optical disc.

The foregoing descriptions are merely exemplary embodiments of the present disclosure, but are not intended to limit the protection scope of the present disclosure. Any equivalent modifications made according to the claims of the present disclosure still fall within the scope of the present disclosure.

What is claimed is:

1. A method for enabling a function module of a terminal that includes a touchscreen, a wireless charger, a plurality of sensors including a temperature sensor and a second sensor, and a processor coupled to the touchscreen, the wireless charger, and the plurality of sensors, wherein the temperature sensor is a different type of sensor than the second sensor, the method comprising:
    detecting a first touch operation by a user on the temperature sensor, wherein the temperature sensor and the second sensor are disposed in an area on an outer surface of the terminal, but not on the touchscreen;
    generating first touch information according to the first touch operation detected by the temperature sensor, wherein the first touch information comprises at least a first generated touch location that is not on the touchscreen and a generated touched-sensor type; and
    enabling the wireless charger based on a determination that the first generated touch location in the first touch information generated according to the first touch operation detected by the temperature sensor and the generated touched-sensor type in the first touch information generated according to the first touch operation detected by the temperature sensor are the same as a first saved touch location and a saved touched-sensor type, respectively, that are used for enabling the wireless charger.

2. The method according to claim 1, wherein the terminal includes a camera and a loudspeaker coupled to the processor, and wherein the method further comprises:
    detecting a second touch operation by the user on the second sensor;
    generating second touch information according to the second touch operation, wherein the second touch information comprises a second generated touch location and a generated touch duration;
    enabling a video recording function of the camera based on a determination that the second generated touch location and the generated touch duration are the same as a second saved touch location that is not on the touchscreen and a saved touch duration, respectively, that are used for enabling the video recording function;
    detecting a third touch operation by the user on the second sensor;
    generating third touch information according to the third touch operation, wherein the third touch information comprises a third generated touch location and a generated touch gesture; and
    enabling the loudspeaker based on a determination that the third generated touch location and the generated touch gesture are the same as a third saved touch location and a saved touch gesture, respectively, that are used for enabling the loudspeaker.

3. The method according to claim 1, wherein the terminal further comprises an earpiece coupled to the processor, and wherein the method further comprises enabling the earpiece based on second touch information generated according to a second touch operation detected by the second sensor.

4. A terminal device, comprising:
    a touchscreen;
    a wireless charger,
    a plurality of sensors including a temperature sensor and a second sensor disposed in an area on an outer surface of the terminal device, but not on the touchscreen, wherein the temperature sensor is configured to detect a first touch operation of a user, wherein the temperature sensor is a different type of sensor than the second sensor; and
    a processor coupled to the touchscreen, the wireless charger, and the plurality of sensors, and configured to:
        generate touch information according to the first touch operation detected by the temperature sensor, wherein the touch information comprises at least a generated touch location that is not on the touchscreen and a generated touched-sensor type; and
        enable the wireless charger based on a determination that the generated touch location in the first touch information generated according to the first touch operation detected by the temperature sensor and the generated touched-sensor type in the first touch information generated according to the first touch operation detected by the temperature sensor are the same as a first saved touch location and a saved touched-sensor type, respectively, that are used for enabling the wireless charger.

5. The terminal device according to claim 4, further comprising an earpiece coupled to the processor, and wherein the processor is configured to enable the earpiece based on second touch information generated according to a second touch operation detected by the second sensor.

6. The terminal according to claim 4, further comprising an audio monitor coupled to the processor, and wherein the processor is configured to enable the audio monitor based on second touch information generated according to a second touch operation detected by the second sensor.

* * * * *

UNITED STATES PATENT AND TRADEMARK OFFICE
CERTIFICATE OF CORRECTION

PATENT NO. : 9,965,086 B2  
APPLICATION NO. : 14/980444  
DATED : May 8, 2018  
INVENTOR(S) : Min Ye et al.

Page 1 of 1

It is certified that error appears in the above-identified patent and that said Letters Patent is hereby corrected as shown below:

On the Title Page

Under Foreign Patent Documents should read:  
CN 202160214 U 3/2012

Signed and Sealed this  
Tenth Day of July, 2018

Andrei Iancu  
*Director of the United States Patent and Trademark Office*